United States Patent
Fujii et al.

(10) Patent No.: US 9,304,585 B2
(45) Date of Patent: Apr. 5, 2016

(54) SUBSTITUTIONAL REALITY SYSTEM CONTROL DEVICE, SUBSTITUTIONAL REALITY SYSTEM, SUBSTITUTIONAL REALITY SYSTEM CONTROL METHOD, AND COMPUTER-READABLE NON-TRANSITORY RECORDING MEDIUM

(71) Applicant: RIKEN, Wako-shi, Saitama (JP)

(72) Inventors: Naotaka Fujii, Wako (JP); Sohei Wakisaka, Wako (JP); Keisuke Suzuki, Wako (JP)

(73) Assignee: RIKEN, Wako-shi, Saitama (JP)

( * ) Notice: Subject to any disclaimer, the term of this patent is extended or adjusted under 35 U.S.C. 154(b) by 0 days.

(21) Appl. No.: 14/422,109

(22) PCT Filed: Aug. 15, 2013

(86) PCT No.: PCT/JP2013/071961
§ 371 (c)(1),
(2) Date: Mar. 12, 2015

(87) PCT Pub. No.: WO2014/027681
PCT Pub. Date: Feb. 20, 2014

(65) Prior Publication Data
US 2015/0227196 A1    Aug. 13, 2015

(30) Foreign Application Priority Data
Aug. 17, 2012  (JP) ................. 2012-181114

(51) Int. Cl.
G06F 3/01  (2006.01)
G02B 27/01  (2006.01)
G06T 3/40  (2006.01)
(Continued)

(52) U.S. Cl.
CPC .............. *G06F 3/013* (2013.01); *G02B 27/017* (2013.01); *G06F 3/011* (2013.01); *G06T 3/40* (2013.01); *G06T 11/60* (2013.01); *G06T 19/006* (2013.01); *H04N 5/23238* (2013.01)

(58) Field of Classification Search
CPC .............................. G06F 3/011; G02B 27/017
See application file for complete search history.

(56) References Cited

U.S. PATENT DOCUMENTS

| | | |
|---|---|---|
| 5,146,331 A | 9/1992 | Tsuchida |
| 5,926,116 A | 7/1999 | Kitano et al. |

(Continued)

FOREIGN PATENT DOCUMENTS

| | | |
|---|---|---|
| JP | S 62-62670 A | 3/1987 |
| JP | H 3-262285 A | 11/1991 |

(Continued)

OTHER PUBLICATIONS

International Search Report dated Sep. 17, 2013 from PCT/JP2013/071961, 3 pages.

(Continued)

*Primary Examiner* — Dennis Joseph
(74) *Attorney, Agent, or Firm* — Ohlandt, Greeley, Ruggiero & Perle, L.L.P.

(57) ABSTRACT

A control device comprises a past video image acquirer acquiring a past video image captured at a given location, a live video image acquirer acquiring a live video image captured at the given location, and a video image switcher switching the video image displayed by a head-mounted display at the given location between the past video image and live video image.

9 Claims, 7 Drawing Sheets

(51) Int. Cl.
*G06T 11/60* (2006.01)
*G06T 19/00* (2011.01)
*H04N 5/232* (2006.01)

(56) References Cited

U.S. PATENT DOCUMENTS

| | | | |
|---|---|---|---|
| 6,020,891 A | 2/2000 | Rekimoto | |
| 8,730,405 B2 | 5/2014 | Nishioka | |
| 2008/0068285 A1* | 3/2008 | Kondo | H04N 5/44582 345/1.1 |

FOREIGN PATENT DOCUMENTS

| | | |
|---|---|---|
| JP | H 8-69449 A | 3/1996 |
| JP | H 10-51711 A | 2/1998 |
| JP | H 10-191355 A | 7/1998 |
| JP | 2000-82107 A | 3/2000 |
| JP | 2000-333044 A | 11/2000 |
| JP | 2006-48672 A | 2/2006 |
| JP | 2009-118425 A | 5/2009 |

OTHER PUBLICATIONS

Written Opinion dated Sep. 17, 2013 from PCT/JP2013/071961, 3 pages.
Japanese Office Action (Notification of Reasons for Rejection) dated Jul. 8, 2014 from JP Patent Application No. 2012-181114, 6 pages.
Suzuki, et al.; "Substitutional Reality System: A Novel Experimental Platform for Experiencing Alternative Reality", Scientific Reports, 2:459, published Jun. 21, 2012, pp. 1 through 9.
Suzuki, et al.; "Substitutional Reality System", Interaction 2011 of Information Processing Society of Japan (IPSJ), Mar. 12, 2011, 6 pages.

* cited by examiner

SUBSTITUTIONAL REALITY SYSTEM CONTROL DEVICE, SUBSTITUTIONAL REALITY SYSTEM, SUBSTITUTIONAL REALITY SYSTEM CONTROL METHOD, AND COMPUTER-READABLE NON-TRANSITORY RECORDING MEDIUM

TECHNICAL FIELD

The present disclosure relates to a substitutional reality system control device, substitutional reality system, substitutional reality system control method, program, and non-transitory recording medium.

BACKGROUND ART

It has been a challenge in the research field of virtual reality how to make a subject perceive an incident that is not actually happening in front of him (for example, an incident displayed in an artificial content, an incident displayed in a past video image, or an incident at a location other than the viewing site) as an incident actually happening in front him.

For example, "augmented reality" and "telepresence" are among the above techniques.

In the "augmented reality," a live video image from the user's viewpoint is displayed on a display (for example, a head-mounted display worn by the subject on the head) with a CG technology video image superimposed thereon (for example, see Patent Literature 1 to 3 below).

On the other hand, in the "telepresence," a video image captured by a remotely-located camera is displayed in real time on a head-mounted display worn by the viewer on the head and the imaging orientation of the camera is remotely controlled in conjunction with the movement of the head of the viewer.

For example, Patent Literature 1 below discloses a technique of capturing an image in the orientation behind a portable display with a camera and superimposing on the image an image of a three-dimensional virtual object in accordance with the position and orientation of the camera. This technique is considered to enable the user to experience a feeling of the three-dimensional virtual object actually existing.

Furthermore, Patent Literature 2 below discloses a technique of capturing with a camera an image of an object on which a two-dimensional code is printed, acquiring information corresponding to the two-dimensional code from a database, and displaying the acquired information and object in a superimposed manner on a display.

Furthermore, Patent Literature 3 discloses a technique of identifying the image data matching captured image data captured by imaging means and acquiring a web site corresponding to the image data from the WWW server.

CITATION LIST

Patent Literature

Patent Literature 1: Unexamined Japanese Patent Application Kokai Publication No. H10-51711 (published on Feb. 20, 1998);

Patent Literature 2: Unexamined Japanese Patent Application Kokai Publication No. 2000-82107 (published on Mar. 21, 2000); and Patent Literature 3: Unexamined Japanese Patent Application Kokai Publication No. 2006-48672 (published on Feb. 16, 2006).

SUMMARY OF INVENTION

Technical Problem

However, the prior art techniques have failed to make the subject perceive an incident that is not actually happening in front of him as an incident actually happening in front of him (making a subject experience such perception is termed "substitutional reality" in this specification). This is because as for such a video image of an incident that is not actually happening in front of a subject (termed "a substitutional video image," hereafter), there are many factors inhibiting the perception that the video image is of what is actually happening in the video image itself or in the environment of viewing the video image (for example, unnatural CGs, unnatural movement in the video image, and unnatural scenes in the video image).

Particularly, in the prior art, when a substitutional video image is displayed, it is impossible in most cases to eliminate from the subject the perception that "I am watching a video image of whit is not actually happening" even if the video image is highly sophisticated. Therefore, It is difficult in the prior art to make the subject experience substitutional reality.

For example, in the above "augmented reality," unnatural CGs superimposed on a live video image make the subject determine that the video image is artificial; thus, it is difficult to realize substitutional reality. On the other hand, in the above "telepresence," a video image of a remote place is displayed in the first place. Therefore, the subject never perceives that the video image is of an incident actually happening in front of him and the "telepresence" does not contribute to realizing substitutional reality.

The present disclosure is made with the view of the above problem and realizes a substitutional reality system enabling the subject to perceive an incident that is not actually happening in front of him as an incident seemingly actually happening in front of him.

Solution to Problem

In order to solve the above-mentioned problem, the substitutional reality system control device according to the present disclosure comprises live video image acquisition means acquiring a live video image that is a video image captured at a given location and captured at the present moment; substitutional video image acquisition means acquiring a substitutional video image that is a video image different from the live video image and of which the viewpoint is the given location; and video image switching means switching the video image displayed by a display device at the given location to the live video image, the substitutional video image, or a composite video image obtained by combining the live video image and substitutional video image.

Furthermore, the substitutional reality system according to the present disclosure comprises a first imaging device capturing a past video image that is a video image captured at a given location in the past; a second imaging device capturing a live video image that is a video image captured at the given location at the present moment; a display device displaying a video image at the given location; and a substitutional reality system control device controlling the substitutional reality system, wherein the substitutional reality system control device comprises past video image acquisition means acquiring the past video image captured by the first imaging device; live video image acquisition means acquiring the live video image captured by the second imaging device; and video image switching means switching the video image displayed by the display device to the past video image, the live video image, or a composite video image obtained by combining the past video image and live video image.

Furthermore, the substitutional reality system control method according to the present disclosure is a substitutional reality system control method controlling a substitutional reality system, comprising a live video image acquisition step of acquiring a live video image that is a video image captured at a given location and captured at the present moment; a substitutional video image acquisition step of acquiring a substitutional video image that is a video image different from the live video image and of which the viewpoint is the given location; and a video image switching step of switching the video image displayed by a display device at the given location to the live video image, the substitutional video image, or a composite video image obtained by combining the live video image and substitutional video image.

Advantageous Effects of Invention

The present disclosure enables the subject to perceive an incident that is not actually happening in front of him as an incident seemingly actually happening in front of him.

DESCRIPTION OF EMBODIMENTS

An embodiment of the present disclosure will be described hereafter with reference to the drawings.

[Configuration of Substitutional Reality System 100]

Figure 1:
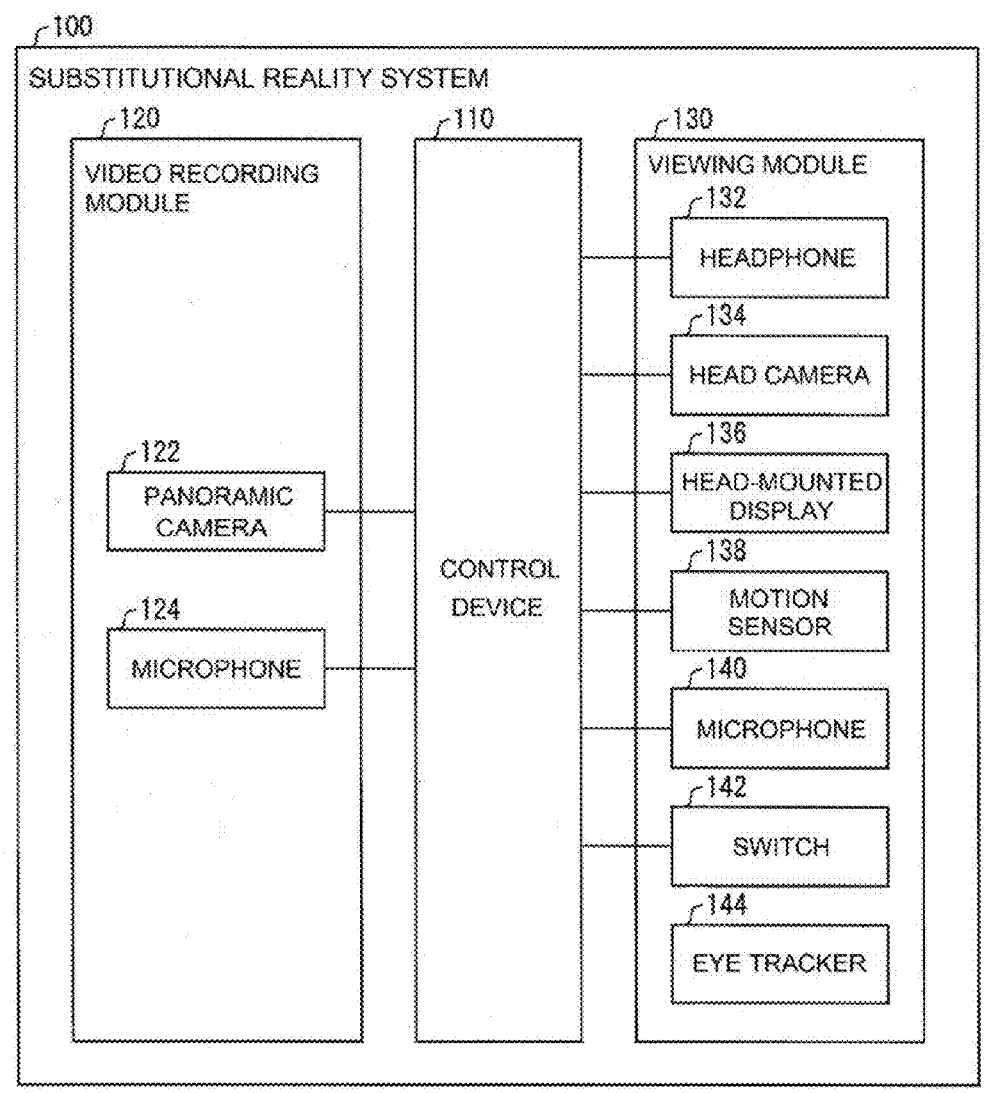
FIG. 1 shows the system configuration of the substitutional reality system according to an embodiment of the present disclosure.

First, the system configuration of a substitutional reality system 100 according to an embodiment of the present disclosure will be described with reference to FIGS. 1 to 3. FIG. 1 shows the system configuration of the substitutional reality system 100 according to an embodiment of the present disclosure.

The substitutional reality system 100 shown in FIG. 1 is a system enabling the subject to experience substitutional reality. As shown in FIG. 1, the substitutional reality system 100 comprises a control device 110, a video recording module 120, and a viewing module 130.

(Control Device 110)

The control device 110 controls the substitutional reality system 100. For example, the control device 110 can be realized by a personal computer or by a server or desiccated device.

(Video Recording Module 120)

Figure 2:
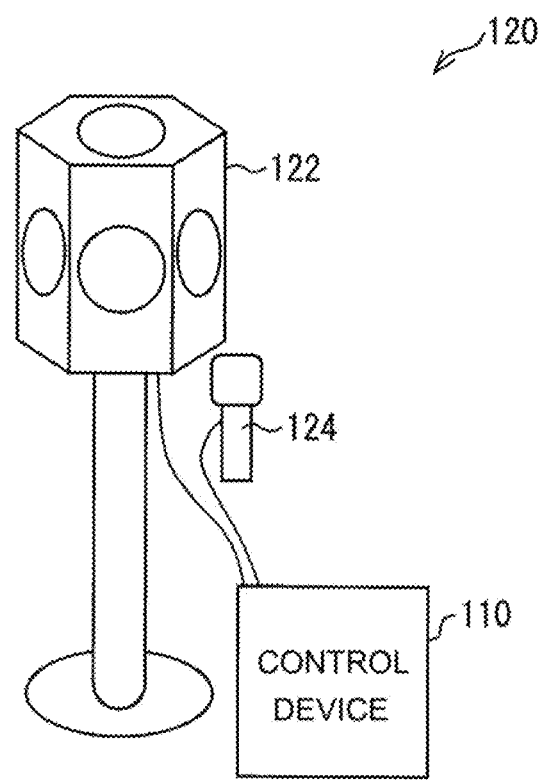
FIG. 2 shows a specific example of the video recording module according to the embodiment of the present disclosure.

FIG. 2 shows a specific example of the video recording module 120 according to Embodiment 1 of the present disclosure. The video recording module 120 is used to capture and record past video images (video images treated as those captured in the past). As shown in FIG. 2, the video recording module 120 comprises an all-around panoramic camera 122 and a microphone 124.

The panoramic camera 122 captures a video image of the surroundings. The panoramic camera 122 comprises multiple imaging devices of which the imaging orientation is different from each other. Thus, the panoramic camera 122 can capture video images in all orientations (horizontally 360° and vertically 360°). The video images captured by the panoramic camera 122 are output to the control device 110 and treated as past video images captured in the past at the imaging position. The panoramic camera 122 can be substituted by a camera in which a one-shot panoramic mirror lens is mounted.

The microphone 124 collects ambient sounds. The sounds collected by the microphone 124 are output to the control device 110 and treated as the sounds of the past video images.

(Viewing Module 130)

Figure 3:
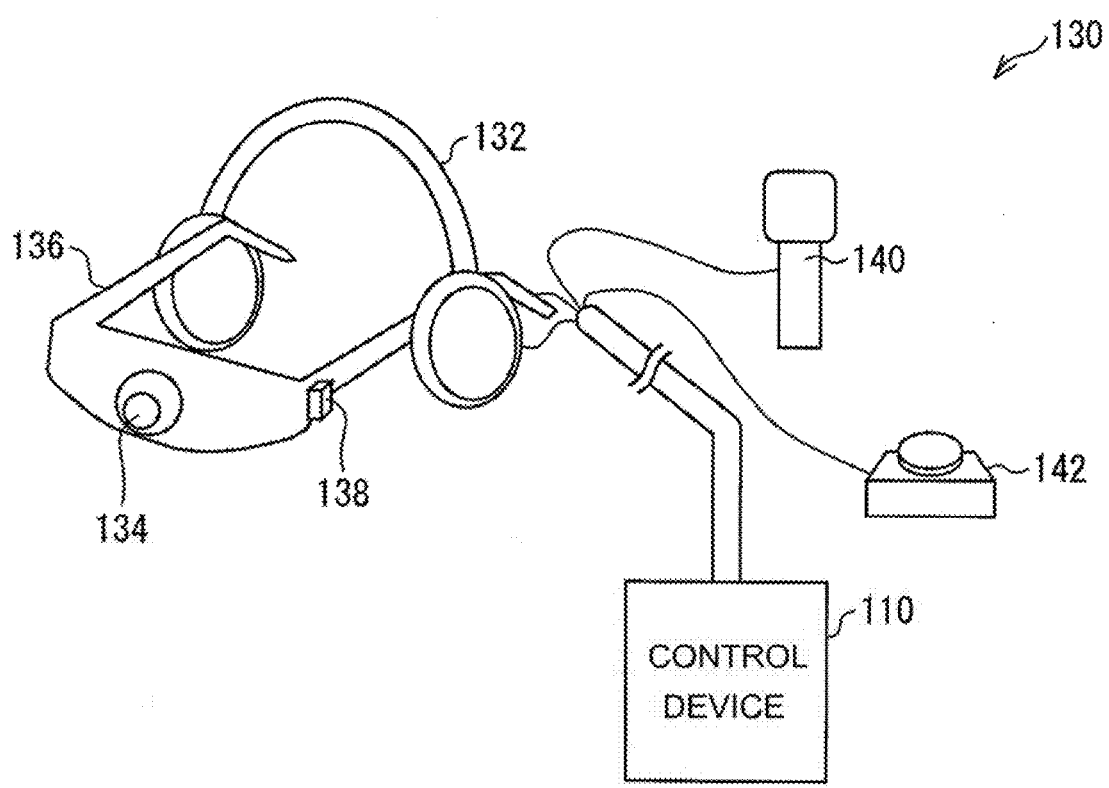
FIG. 3 shows a specific example of the viewing module according to the embodiment of the present disclosure.

FIG. 3 shows a specific example of the viewing module 130 according to Embodiment 1 of the present disclosure. The viewing module 130 is used to capture a live video image (a video image treated as the one captured at the present moment in real time) and view the video images (the live video image and past video images). As shown in FIG. 3, the viewing module 130 comprises a headphone 132, a head camera 134, a head-mounted display 136, a motion sensor 138, a microphone 140, a switch 142, and an eye tracker 144 (see FIG. 1).

The head camera 134 captures a video image in front of the head of the subject. The video image captured by the head camera 134 is output to the control device 110 as the live video image currently captured at the imaging position. The microphone 140 records ambient sounds. The sounds recorded by the microphone 140 are output to the control device 110 as the sounds of the live video image.

The head-mounted display 136 displays the video image output from the control device 110 (namely the live video image or a past video image). The headphone 132 outputs the sounds output from the control device 110 (namely the sounds of the live video image or the sounds of the past video image).

The motion sensor 138 detects the movement of the head of the subject. For example, with the use of gyro sensors and inclination sensors, the motion sensor 138 detects the angle and inclination of the head of the subject. The motion sensor 138 can be the one detecting the position of the head. Furthermore, the motion sensor 138 can be substituted by a motion capture system using a camera installed in the experience site.

The eye tracker 144 measures the gaze orientation to find out where on the screen of the head-mounted display 136 the subject is looking at. For example, the eye tracker 144 captures a video image in the area of which at least the eyes of the subject are contained and detects the orientation of the pupils in the video image to measure the gaze orientation.

The switch 142 is used to give the control device 110 a command to switch video images. Pressing the switch 142, the subject can give the control device 110 a command to switch video images.

(Functional Configuration of Control Device 110)

Figure 4:
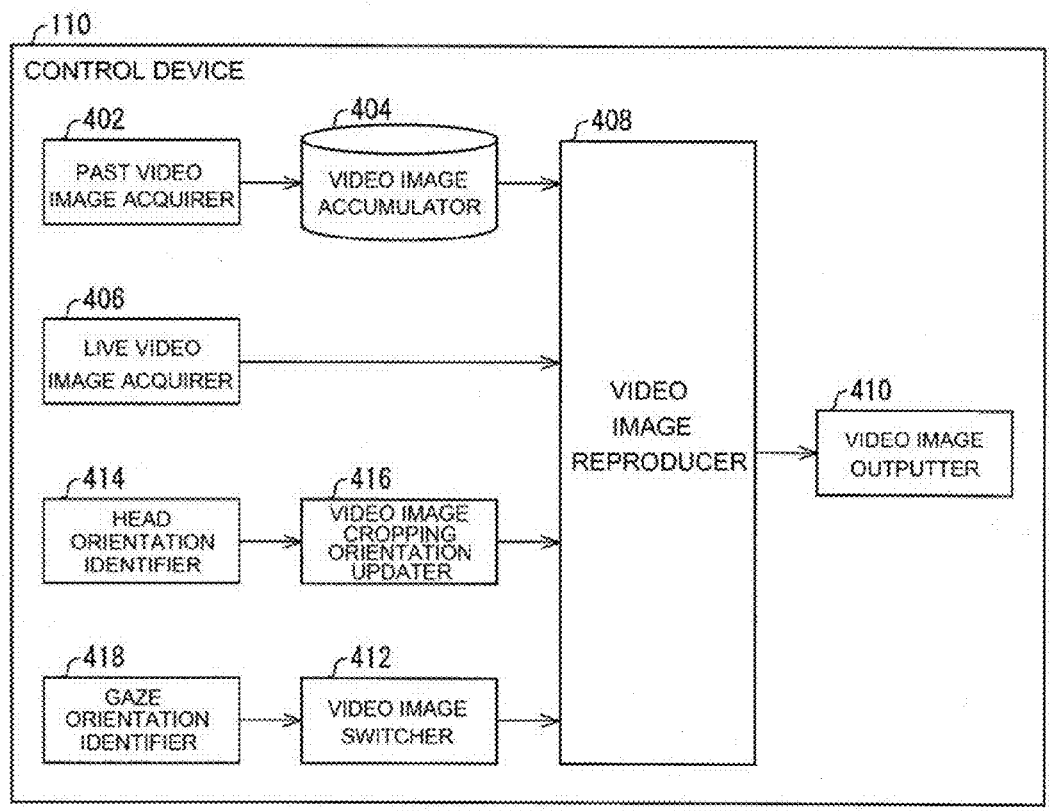
FIG. 4 shows the functional configuration of the control device according to the embodiment of the present disclosure.

The functional configuration of the control device 110 will be described hereafter with reference to FIG. 4. FIG. 4 shows the functional configuration of the control device 110 according to Embodiment 1 of the present disclosure. As shown in FIG. 4, the control device 110 comprises a past video image acquirer 402, a video image accumulator 404, a live video image acquirer 406, a video image reproducer 408, a video image outputter 410, a video image switcher 412, a head orientation identifier 414, a video image cropping orientation updater 416, and a gaze orientation identifier 418.

The past video image acquirer 402 acquires past video images captured by the panoramic camera 122. The video image accumulator 404 accumulates the past video images acquired by the past video image acquirer 402. The video image accumulator 404 can be provided outside the control device 110.

The live video image acquirer 406 acquires a live video image captured by the head camera 134.

The video image reproducer 408 reproduces a past video image accumulated in the video image accumulator 404 or the live video image acquired by the live video image acquirer 406. The video image outputter 410 outputs the past video image or live video image reproduced by the video image reproducer 408 to the head-mounted display 136.

The video image switcher 412 switches the video image output to the head-mounted display 136 to the above past video image or to the above live video image. For example, the video image switcher 412 conducts the above switching when some event ("a video image switching event," hereafter) occurs at the control device 110.

For example, the above video image switching event occurs at times indicated by the tester such as when the tester presses the button. Alternatively, the video image switching event occurs at times preindicated by the tester in the reproduced video image. Furthermore, the video image switching event can occur at times indicated by the subject (for example, when the switch 142 is pressed).

Furthermore, the above video image switching event can occur when the motion sensor 138 detects the orientation of the head of the subject or the eye tracker 144 detects a specific gaze orientation (see Scheme 4).

Presumable video image switching patterns include switching from a past video image to the live video image, switching from the live video image to a past video image, switching from a first past video image to a second past video image, and switching to another scene in the same past video image.

The head orientation identifier 414 identifies the orientation of the head of the subject based on signals from the motion sensor 138.

The gaze orientation identifier 418 identifies the gaze orientation of the subject (namely which area in the presented video image the subject is looking at) based on signals from the eye tracker 144.

The video image cropping orientation updater 416 updates the cropping orientation of the video image to output to the head-mounted display 136 in accordance with the orientation of the head of the subject that is identified by the head orientation identifier 414.

In this specification, the expression "to crop a video image" means to crop from a video image captured by the panoramic camera 122 a partial video image to display on the head-mounted display 136, which is the video image of the area corresponding to the orientation of the head. Furthermore, the expression "to update the video image cropping orientation" means to update the above partial video image to the partial video image of the area corresponding to the orientation of the head.

Incidentally, in this embodiment, if the gaze is shifted without any head movement of the subject, the video image cropping orientation is not updated. However, the video image itself appearing on the subject's retina changes; thus, at this point, the switching between a past video image and the live video image can be conducted. In this way, it is difficult for the subject to notice such a switching as in the switching between a past video image and the live video image upon movement of the head (Scheme 4 below). Furthermore, where in the video image the subject focuses on can be identified based on the gaze orientation of the subject. Therefore, the switching according to the focused point can be conducted. For example, "a switching occurs when the subject has paid attention to 'the chair' in the video image."

(Proceeding of Processing by Control Device 110)

Figure 5:
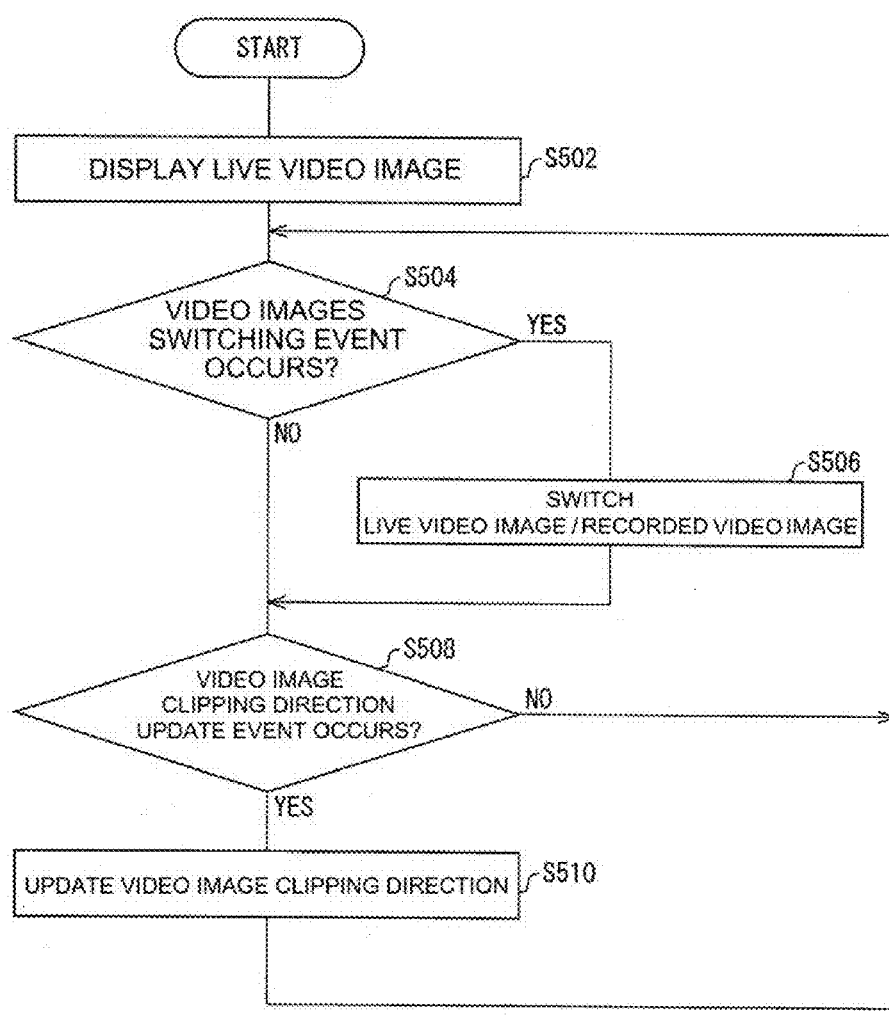
FIG. 5 is a flowchart showing the proceeding of the processing by the control device according to the embodiment of the present disclosure.

The proceeding of the processing by the control device 110 will be described hereafter with reference to FIG. 5. FIG. 5 is a flowchart showing the proceeding of the processing by the control device 110 according to the embodiment of the present disclosure.

First, the control device 110 displays a live video image captured by the head camera 134 on the head-mounted display 136 (Step S502).

Subsequently, if some video image switching event occurs at the control device 110 (Step S504; Yes), the control device 110 (video image switcher 412) switches the video image to display on the head-mounted display 136 (Step S506). Then, the control device 110 returns the processing to the Step S504.

For example, when a live video image is displayed on the head-mounted display 136, the control device 110 switches the video image to display on the head-mounted display 136 to a recorded video image from the live video image. Conversely, when a recorded video image is displayed on the head-mounted display 136, the control device 110 switches the video image to display on the head-mounted display 136 to the live video image from the recorded video image.

On the other hand, if some video image cropping orientation update event occurs at the control device 110 (for example, the motion sensor 138 detects any shift of the orientation of the head) (Step S508; Yes), the control device 110 (video image cropping orientation updater 416) updates the video image cropping orientation of the video image displayed on the head-mounted display 136 (Step S510). Then, the control device 110 returns the processing to the Step S504.

For example, if the orientation of the head of the subject is changed while a past video image is displayed, the control device 110 makes a change to a past video image corresponding to that orientation.

On the other hand, if the orientation of the head of the subject is changed while the live video image is displayed, the imaging orientation of the head camera 134 is also changed to that orientation; thus, the cropping orientation of the live video image displayed on the head-mounted display 136 is automatically changed to that orientation.

Through the above proceeding, the control device 110 can switch the video image to display on the head-mounted display 136 to a past video image or to the live video image each time a video image switching event occurs during a succession of substitutional reality experience realized by the substitutional reality system 100. Furthermore, each time the subject changes the orientation of his head, the control device 110 can change the cropping orientation of the video image displayed on the head-mounted display 136 to that head orientation.

(Specific Example of Video Image Switching Procedure)

A specific example of the substitutional reality experience with the substitutional reality system 100 will be described hereafter with reference to FIGS. 6A to 6E. FIGS. 6A to 6E show a specific example of the substitutional reality experience with the substitutional reality system 100 according to the embodiment of the present disclosure. FIGS. 6A to 6E show typical scenes in substitutional reality experience in a time-series manner.

(A. Scene of Capturing a Past Video Image)

Figure 6A:
FIGS. 6A to 6E show specific examples of the substitutional reality experience with the substitutional reality system according to the embodiment of the present disclosure.

FIG. 6A shows a scene of capturing a past video image in substitutional reality experience. In this video image-capturing scene, the panoramic camera 122 is placed at a specific position in an experience room and the panoramic camera 122 captures a panoramic past video image in the experience room. Furthermore, a subject is guided into the experience room and told by the guide that the experience occurs in this experience room. Naturally, such conversations are captured by the panoramic camera 122. Subsequently, the subject moves to the position where the panoramic camera 122 was placed in the same room and wears the head-mounted display 136. The video image displayed by the head-mounted display 136 is the live video image at first (the live video image captured by the head camera 134), and then is switched to a past video image without the subject noticing. As in this way, displaying the live video image at first creates a sense of "viewing the live video image" in the subject and makes it difficult for the subject to notice the switching to a past video image.

(B. Recorded Scene)

Figure 6B:
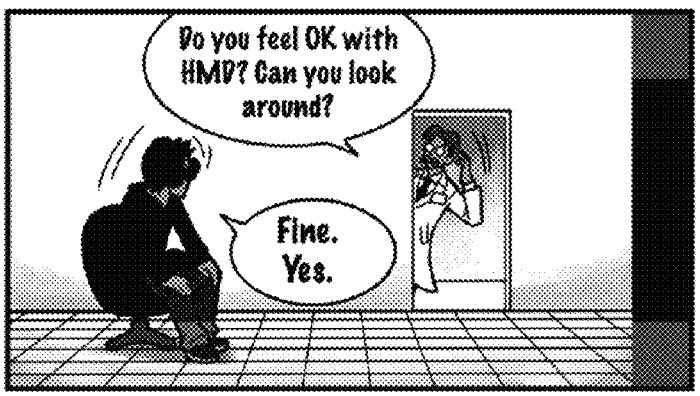

FIG. 6B shows a recorded scene in the substitutional reality experience. In this recorded scene, the guide asks the subject about the conditions of the head-mounted display. This is from a past video image. The subject answers to the questions without noticing that the questions are from a past video image.

(C. Recorded Scene)

Figure 6C:

FIG. 6C shows a recorded scene in the substitutional reality experience. Following the scene shown in FIG. 6B, the past video image captured in FIG. 6A is displayed on the head-mounted display 136 as shown in FIG. 6C. The subject himself/herself appears in this video image; therefore, the subject notices that the video image is a past video image. Then, the subject perceives that the video image was switched to a past video image without his knowledge, and starts to suspect that the video image displayed on the head-mounted display may be manipulated.

(D. Recorded Scene)

Figure 6D:

FIG. 6D shows a recorded scene in the substitutional reality experience. In this recorded scene, the guide tells the subject that the video image in FIG. 6C was a past video image. Then, the subject is told that the video image he is currently viewing is the live video image. However, this account is given in a past video image. Nevertheless, the subject deeply believes that the video image he is currently viewing is the live video image because the scene is switched and he was told so. Particularly, in the scene of FIG. 6C, the past video image was staged to look like a past video image by showing the subject himself/herself in the video image. Therefore, the account in the scene of FIG. 6D sounds more credible and then the video image in the scene of FIG. 6D becomes more realistic.

(E. Live Scene)

Figure 6E:

FIG. 6E shows a live scene in the substitutional reality experience. In this live scene, the guide further tells the subject that the video image he is currently viewing is the live video image. As a result, the subject, who has no doubt of himself/herself having already been back in the reality in the scene of FIG. 6D, cannot distinguish what is in the reality from what is in the past.

(Scheme of Switching Video Images)

As described above, the substitutional reality system 100 of this embodiment enables the subject to experience the substitutional reality by properly switching the video images for the subject to view. Particularly, the substitutional reality system 100 of this embodiment adopts not only the above-described matters but also various schemes represented by those below to switch the video images in a more natural manner and make it more difficult for the subject to make a distinction.

(Scheme 1: In Conjunction with the Head Orientation)

As described earlier, the substitutional reality system 100 of this embodiment changes the cropping orientation of the video image to display in conjunction with the movement of the head of the subject. The substitutional reality system 100 of this embodiment realizes this matter by the following (1) to (3): (1) capturing a panoramic video image with the panoramic camera 122; (2) identifying the orientation of the head of the subject based on detection signals from the motion sensor 138 mounted on the head of the subject; and (3) cropping from the panoramic video image a video image in the orientation corresponding to the orientation of the head of the subject.

(Scheme 2: Capturing Video Images at the Same Position)

As described earlier, in the substitutional reality system 100 of this embodiment, the imaging position of past video images and the imaging position of the live video image coincide with each other. More preferably, the focal point of the panoramic camera 122 and the rotation center of the head of the subject nearly coincide with each other. In order to realize this matter, in the substitutional reality system 100 of this embodiment, the panoramic camera 122 is removed and the subject sits where the panoramic camera 122 was for the substitutional reality experience.

(Scheme 3: Image Quality Adjustment)

In the substitutional reality system 100 of this embodiment, the image quality of at least one of the past video image and live video image can be adjusted so that the past video image and live video image have an equal or nearly equal image quality. For example, the substitutional reality system 100 adjusts the image quality using adjustment values obtained from characteristic data of the imaging elements of both cameras. Alternatively, a reference image is displayed in both video images and the image quality is automatically adjusted so that the reference images have a similar image quality.

(Scheme 4: Timing of Switching)

When video images are switched, difference in image quality between a past video image and the live video image sometimes occurs. The substitutional reality system 100 of this embodiment can switch the video images when any movement of the head of the subject is detected. Consequently, the video images are switched when the displayed video image is changed, in other words when the video image cropping orientation is changed. Therefore, it is more difficult for the subject to notice the above difference and even the switching itself. Furthermore, the video images can be switched when the eye tracker 144 detects rapid eye movement (saccade). Also in such a case, it is more difficult for the subject to notice the switching. It is also possible to conduct the switching after the eye tracker 144 confirms that the subject pays attention to a specific object in the video image (preferably, an object that does not change before and after the switching).

(Scheme 5: Superimposing (Blending) Video Images)

Upon switching video images, the substitutional reality system 100 of this embodiments switches between a past video image and the live video image. A past video image and the live video image can be superimposed. In doing so, it is possible to process at least one video image such as removing the background or extracting a person. In this way, for example, it is possible to display an object such as a person who is perceived as really existing in a past video image, whereby the past video image becomes more realistic. Furthermore, an object in a past video image and an object in the live video image can be made to coexist in the past video image or live video image. Consequently, it is more difficult to distinguish between the past video image and the live video image.

Furthermore, it is possible in creating a superimposed video image to adjust the transparency rates of the past video image and live video image individually. For example, it is possible to make a past video image fade into or fade out from the live video image. In this way, it is more difficult for the subject to notice a person who does not exist in the live video image appearing and disappearing.

The transparency rates of a past video image and the live video image can be set on a pixel basis in the video images. Even if a past video image and the live video image are always superimposed, the actual superimposition can be limited to only a part of the ambient space (for example, the right half or the left half). Furthermore, the pixel-based transparency rate can be changed dynamically in a time-series manner or in accordance with the action of the subject so as to change the partial ambient space in which the past video image and live video image are blended and/or the shape thereof.

With the above, for example, it is possible to make a person in the live video image and a person in a past video image appear on the screen at the same time and have a conversation. A person in the live video image and a person in a past video image can be the same person.

(Scheme 6: Adjustment of Objects in Video Image)

In the substitutional reality system 100 of this embodiment, the imaging environments of the past video image and live video image are adjusted so as to display the same object in both video images. In this way, an object does not suddenly disappear or appear when the video images are switched. However, as described above, even if an object that is not common to the past video image and live video image appears and disappears, it can be made more difficult for the subject to notice the object by making the object fade in and fade out.

(Scheme 7: Effect of Inducing Confusion in Subject)

The substitutional reality system 100 of this embodiment adjusts the times of switching the video images and the contents of the video images before and after switching so that the subject falls into confusion. It is possible to make the subject mistake a past video image for the live video image by, for example, including in the past video image narration mimicking the live video image as exemplified by FIG. 6D, or switching a past video image to another past video image. The substitutional reality system 100 of this embodiment conducts such an operation multiple times in a succession of substitutional reality experience so that the subject loses confidence in his own judgment and accepts most past video images as incidents actually happening.

(Additional Scheme Upon Switching Video Images)

The substitutional reality system 100 of this embodiment adopts additional schemes as exemplified below to switch the video images in a more natural manner and makes it more difficult for the subject to make a distinction.

(Additional Scheme 1: Scene Experience of Subject Through Five Senses)

The substitutional reality system 100 of this embodiment can further comprise generation means generating at least one of smell, heat, vibration, and feel that is preassociated with the past video image when the video image switching means switches to the past video image. For example, if a past video image contains a scene in which a person falls down, vibration detectable by the subject is generated in that scene while the subject views the past video image. In this way, the subject is made to perceive that the person seemingly actually falls down, whereby the past video image can become more realistic. As another example, if a past video image contains a fire scene, heat and smell detectable by the subject are generated in that scene while the subject views the past video image. In this way, the subject is made to perceive that the fire is seemingly actually happening, whereby the past video image can become more realistic.

For example, in the case of generating smell, heat, vibration, or feel, the smell, heat, vibration, or feel can be realized by controlling any known device installed near the subject and generating smell, heat, vibration, or feel (for example, a smell generation device, a heat generation device such as a lighting apparatus, a vibration generator, feel control device, and the like) by means of the control device 110.

(Additional Scheme 2: Timing of Switching)

The substitutional reality system 100 of this embodiment can switch the video images at times specified by the subject (for example, when the switch 142 is pressed). In doing so, it is possible to create a time-lag between the time specified by the subject and the time of switching the video images. In this way, it is more difficult for the subject to distinguish between the past video images and live video image, whereby the past video image can become more realistic. This is because most subjects believe that the video images are switched when they specify so.

(Additional Scheme 3: Editing of Video Images)

It is possible to edit one or both of the past video image and live video image so that it is more difficult for the subject to distinguish between the past video image and live video image. For example, both video images are converted to line images or their backgrounds are deleted. In other words, the video images are simplified to make the video images difficult to distinguish from each other.

(Supplementary Notes)

A system in which a past video image and the live video image are selectively presented to the subject is described above by way of example. This embodiment is not confined thereto. For example, the above-described past video image can be a video image different from the above-described live video image and of which the viewpoint coincides with the imaging position of the live video image, and more generally should be termed a substitutional video image. Here, the substitutional video image includes artificial contents, past video images, and video images captured at locations different from the viewing site.

As described above, this embodiment describes a substitutional reality system control device (the control device 110) comprising live video image acquisition means (the live video image acquirer 406) acquiring a live video image that is a video image captured at a given location and captured at the present moment, substitutional video image acquisition means (the past video image acquirer 402) acquiring a substitutional video image that is a video image different from the live video image and of which the viewpoint is the given location, and video image switching means (the video image switcher 412) switching the video image displayed by a display device at the given location to the live video image, the substitutional video image, or a composite video image obtained by combining the live video image and substitutional video image.

(Exemplary Applications of Substitutional Reality System)

As described above, the substitutional reality system 100 of this embodiment enables the subject to experience substitutional reality. This substitutional reality system 100 has a wide range of applications as exemplified below.

(Exemplary Application 1)

For example, the substitutional reality system 100 of this embodiment is applicable to psychological experiments. For example, when the subject is presented with an event on a television monitor, the subject does not believe that the event is actually happening in front of him. However, with the substitutional reality system of this embodiment, the subject can participate in the experiment with such belief. The substitutional reality system 100 of this embodiment is applicable to psychological experiments in which one's belief should experimentally be adjusted. In such a case, as the above-described substitutional video image, for example, an event that does not occur in real life (an event in slower motion than normally) can be prepared.

(Exemplary Application 2)

Furthermore, for example, the substitutional reality system 100 of this embodiment is applicable to immersive first-person games using head-mounted displays. Generally, in such games, the player's in-game position changes according to the operation of the player. It is difficult in the substitutional reality system 100 of this embodiment using a panoramic video camera to reproduce such positional change in a past video image. Therefore, it is difficult to constantly realize the substitutional reality itself during the play. However, it is possible to realize the substitutional reality, for example, upon entering/exiting from the game environment (upon starting and ending the game) exclusively. Using as an interface to enter/exit from the game environment as just mentioned, it is possible to make the game environment more realistic. This is also applicable to use as an interface to start and end watching a movie.

(Exemplary Application 3)

Furthermore, the substitutional reality system 100 of this embodiment can be extended to a mode in which the subject can move during the experience. For example, with the viewing module being adjusted in wiring or made wireless, the subject can move with the viewing module on. With the past video images being precaptured at multiple given locations, the live video image and past video images can be switched as the subject stays at those given positions. Furthermore, by playing only the live video image during the move, the substitutional reality experience while moving around is available. Movable substitutional reality is also applicable to the above-described psychological experiments, games, movies, and the like.

(Program and Non-Transitory Recording Medium)

The functions of the substitutional reality system control device 110 described in the embodiment can be realized on a hardware basis by logical circuits formed on an integrated circuit (IC chip) or on a software basis by using a CPU.

For example, the substitutional reality system control device 110 comprises a CPU executing the commands of programs realizing the functions and various storages (non-transitory recording media) such as a ROM storing the programs, a RAM on which the programs are loaded, and a memory storing the programs and various data. The CPU can read and execute the programs stored in the various storages to realize the functions of the substitutional reality system control device 110.

As the above non-transitory recording media, for example, the following can be used: tapes such as magnetic tapes and cassette tapes, discs including magnetic discs such as floppy (registered trademark) discs and hard discs, and optical discs such as CD-ROM, MO, MD, DVD, and CD-R, cards such as IC cards (including memory cards) and optical cards, semiconductor memories such as mask ROM, EPROM, EEPROM (registered trademark), and flash ROM, and logical circuits such as PLD (programmable logic device) and FPGA (field programmable gate array).

Incidentally, the above programs can be supplied to the substitutional reality system control device 110 via a communication network. The communication network can be any kind of network in so far as the programs can be transferred to the substitutional reality system control device 110. Exemplary applicable wired or wireless communication networks include the Internet, intranets, extra nets, LAN, ISDN, VAN, CATV communication networks, virtual private networks, telephone line networks, mobile communication networks, and satellite communication networks.

Furthermore, any kind of transfer medium can be used to supply the above programs to the substitutional reality system control device 110. For example, the transfer medium cab be a wired one such as an optical network, IEEE1394, USB, power-line carrier, cable TV line, telephone line, and ADSL (asymmetric digital subscriber line). Alternatively, the transfer medium can be a wireless one such as infrared such as IrDA and a remote controller, Bluetooth (registered trademark), IEEE802111 wireless, HDR (high data rate), NFC, DLNA, cellphone network, satellite connection, and digital terrestrial network.

SUMMARY

In order to solve the above-mentioned problem, the substitutional reality system control device according to this embodiment comprises live video image acquisition means acquiring a live video image that is a video image captured at a given location and captured at the present moment; substitutional video image acquisition means acquiring a substitutional video image that is a video image different from the live video image and of which the viewpoint is the given location; and video image switching means switching the video image displayed by a display device at the given location to the live video image, the substitutional video image, or a composite video image obtained by combining the live video image and substitutional video image.

The above substitutional reality system control device switches between the live video image captured at a given location and a substitutional video image of which the viewpoint is the given location, whereby it is difficult for the viewer viewing a video image with a display device to determine whether the video image he is currently viewing is the substitutional video image or the live video image. Thus, the above substitutional reality system control device enables the viewer to experience substitutional reality.

Furthermore, the substitutional reality system according to this embodiment comprises a first imaging device capturing a past video image that is a video image captured at a given location in the past; a second imaging device capturing a live video image that is a video image captured at the given location at the present moment; a display device displaying a video image at the given location; and a substitutional reality system control device controlling the substitutional reality system, wherein the substitutional reality system control device comprises past video image acquisition means acquiring the past video image captured by the first imaging device; live video image acquisition means acquiring the live video image captured by the second imaging device; and video image switching means switching the video image displayed by the display device to the past video image, the live video image, or a composite video image obtained by combining the past video image and live video image.

Furthermore, the substitutional reality system control method according to this embodiment is a substitutional reality system control method controlling a substitutional reality system, comprising a live video image acquisition step of acquiring a live video image that is a video image captured at a given location and captured at the present moment; a substitutional video image acquisition step of acquiring a substitutional video image that is a video image different from the live video image and of which the viewpoint is the given location; and a video image switching step of switching the video image displayed by a display device at the given location to the live video image, the substitutional video image, or a composite video image obtained by combining the live video image and substitutional video image.

Furthermore, the program according to this embodiment is a program for allowing a computer to function as the above substitutional reality system control device, wherein the program allows the computer to function as the means the substitutional reality system control device comprises.

Furthermore, the non-transitory recording medium according to this embodiment is a computer-readable non-transitory recording medium on which the above program is recorded.

The above substitutional reality system, substitutional reality system control method, program, and non-transitory recording medium can yield the same effect as the above substitutional reality system control device.

INDUSTRIAL APPLICABILITY

The present disclosure is preferably applicable to substitutional reality systems presenting substitutional reality to the subject or user.

REFERENCE SIGNS LIST

100 Substitutional reality system
110 Control device (substitutional reality system control device)
120 Video recording module
122 Panoramic camera
124 Microphone
130 Viewing module
132 Headphone
134 Head camera
136 Head-mounted display
138 Motion sensor
140 Microphone
142 Switch
144 Eye tracker
402 Past video image acquirer (substitutional video image acquisition means)
404 Video image accumulator
406 Live video image acquirer (live video image acquisition means)
408 Video image reproducer
410 Video image outputter
412 Video image switcher (video image switching means)
414 Head orientation identifier
416 Video image cropping orientation updater (video image orientation update means)
418 Gaze orientation identifier

What is claimed is:

1. A substitutional reality system control device, comprising:
live video image acquisition means acquiring a live video image that is a video image captured at a given location in an orientation of a head of a viewer in real time;
substitutional video image acquisition means acquiring a substitutional video image that is a panoramic or all-around video image supposed to be captured from the given location;
cropping orientation updating means updating a cropping orientation to crop a partial video image which is an area corresponding to the orientation of the head from the substitutional video image; and
video image switching means switching the video image to be displayed to the head of the viewer by a display device at the given location between the live video image, the substitutional video image, or a composite video image obtained by combining the live video image and substitutional video image,
wherein the video image to be displayed by the display device is switched from a first video image to a second video image by applying at least one switching manner selected from the group consisting of:
(a) the video image to be displayed is switched when an eye tracker detects rapid eye movement of the viewer;
(b) the video image to be displayed is switched when a gaze orientation identifier detects that the viewer pays attention to a predefined object depicted in the first video image and the second video image;
(c) the video image to be displayed is switched at a delayed or different timing from another timing at which the viewer specifies;
(d) a first object depicted in the first video image fades out or a second object depicted in the second video image fades in, while the video image to be displayed is switched;
(e) the video image to be displayed is switched to the live video image when the viewer leaves the given location, and the live video image is displayed while the viewer moves; and
(f) the video image to be displayed is switched between the live video image when the viewer stays at the given location; and
wherein the video image switching means creates the composite video image by superimposing at least a part of the substitutional video image or live video image before the switching on the substitutional video image or live video image after the switching.

2. The substitutional reality system control device according to claim 1, wherein
the panoramic or all-around video image is at least one selected from the group consisting of:
a past video image that is a video image precaptured at the given location in the past;
artificial contents; and
other video images precaptured at other locations different from the given location.

3. The substitutional reality system control device according to claim 1, further comprising:
video image orientation update means updating the orientation of the video image displayed by the display device in accordance with the movement of the head or gaze of the viewer viewing the video image displayed by the display device.

4. The substitutional reality system control device according to claim 1, wherein
the video image switching means displays on the display device the live video image first.

5. The substitutional reality system control device according to claim 1, wherein the video image switching means switches a source image from which the partial video is to be cropped from a first substitutional video image to a second substitutional video image.

6. The substitutional reality system control device according to claim 1, further comprising:
generation means generating at least one of smell, heat, vibration, and feel that is preassociated with the substitutional video image when the display device displays the substitutional video image.

7. A computer-readable non-transitory recording medium storing a program allowing a computer to function as the substitutional reality system control device according to claim 1, wherein the program allows the computer to function as the means that the substitutional reality system control device comprises.

8. A substitutional reality system, comprising:
a first imaging device precapturing a past video image that is a panoramic or all-around video image captured at a given location in the past;
a second imaging device capturing a live video image that is a video image captured at the given location in an orientation of a head of a viewer in real time;
a display device displaying a video image to the head of the viewer at the given location; and
a substitutional reality system control device controlling the substitutional reality system,
wherein the substitutional reality system control device comprises:
past video image acquisition means acquiring the past video image captured by the first imaging device;
live video image acquisition means acquiring the live video image captured by the second imaging device;
cropping orientation updating means updating a cropping orientation to crop a partial video image which is an area corresponding to the orientation of the head from the substitutional video image; and
video image switching means switching the video image to be displayed by the display device between the past video image, the live video image, or a composite video image obtained by combining the past video image and live video image,
wherein the video image to be displayed by the display device is switched from a first video image to a second video image by applying at least one switching manner selected from the group consisting of:
(a) the video image to be displayed is switched when an eye tracker detects rapid eye movement of the viewer;
(b) the video image to be displayed is switched when a gaze orientation identifier detects that the viewer pays attention to a predefined object depicted in the first video image and the second video image;
(c) the video image to be displayed is switched at a delayed or different timing from another timing at which the viewer specifies;
(d) a first object depicted in the first video image fades out or a second object depicted in the second video image fades in, while the video image to be displayed is switched;
(e) the video image to be displayed is switched to the live video image when the viewer leaves the given location, and the live video image is displayed while the viewer moves; and
(f) the video image to be displayed is switched between the live video image when the viewer stays at the given location; and
wherein the video image switching means creates the composite video image by superimposing at least a part of the substitutional video image or live video image before the switching on the substitutional video image or live video image after the switching.

9. A substitutional reality system control method controlling a substitutional reality system, comprising:
a live video image acquisition step of acquiring a live video image that is a video image captured at a given location in an orientation of a head of a viewer in real time;
a substitutional video image acquisition step of acquiring a substitutional video image that is a panoramic or all-around video image supposed to be captured from the given location;
a cropping orientation updating step of updating a cropping orientation to crop a partial video image which is an area corresponding to the orientation of the head from the substitutional video image; and
a video image switching step of switching the video image to be displayed to the head of the viewer by a display device at the given location between the live video image, the substitutional video image, or a composite video image obtained by combining the live video image and substitutional video image,
wherein the video image to be displayed by the display device is switched from a first video image to a second video image by applying at least one switching manner selected from the group consisting of:
(a) the video image to be displayed is switched when an eye tracker detects rapid eye movement of the viewer;
(b) the video image to be displayed is switched when a gaze orientation identifier detects that the viewer pays attention to a predefined object depicted in the first video image and the second video image;
(c) the video image to be displayed is switched at a delayed or different timing from another timing at which the viewer specifies;
(d) a first object depicted in the first video image fades out or a second object depicted in the second video image fades in, while the video image to be displayed is switched;
(e) the video image to be displayed is switched to the live video image when the viewer leaves the given location, and the live video image is displayed while the viewer moves; and
(f) the video image to be displayed is switched between the live video image when the viewer stays at the given location; and
wherein the video image switching step creates the composite video image by superimposing at least a part of the substitutional video image or live video image before the switching on the substitutional video image or live video image after the switching.

\* \* \* \* \*